Jan. 28, 1964  A. FERRARI ETAL  3,119,891
CAMERA FOCUSING MECHANISM
Filed March 30, 1959  2 Sheets-Sheet 2
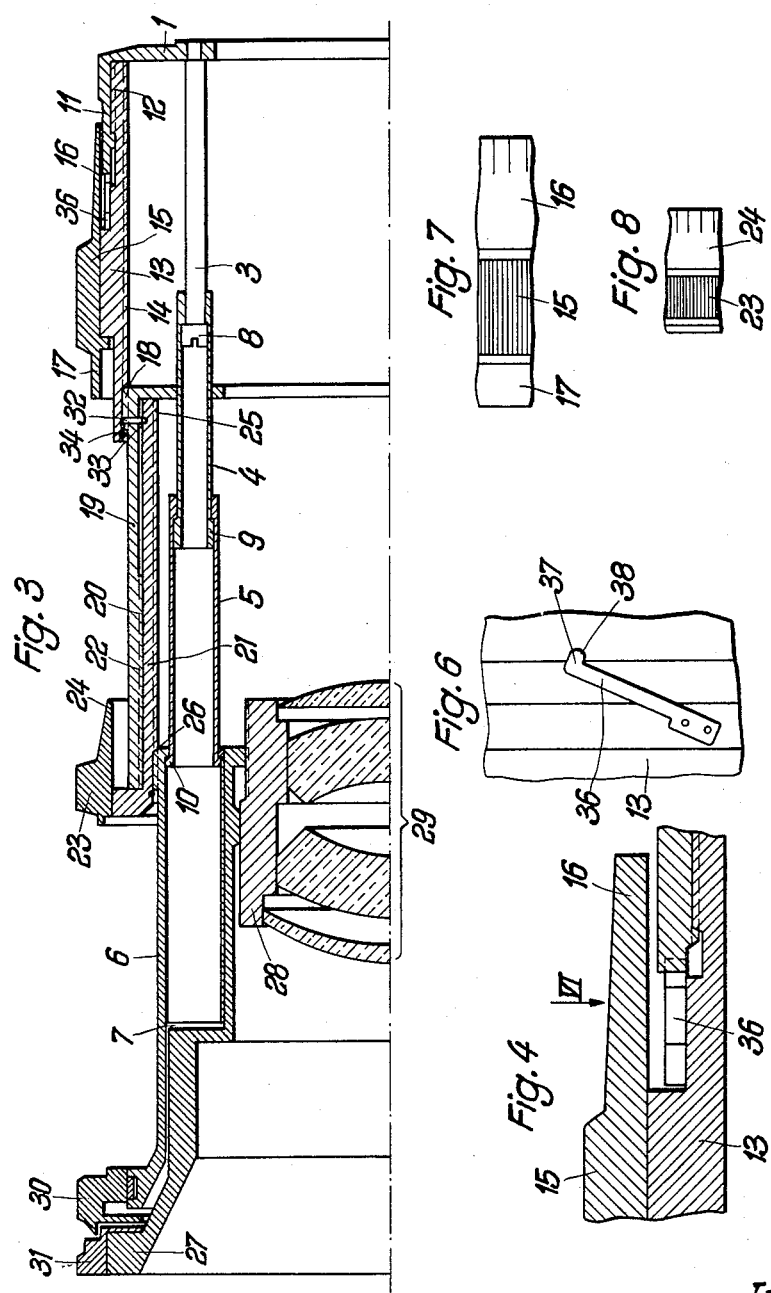
Inventor:
Alfredo Ferrari
Adolf Jasse 3,119,891
CAMERA FOCUSING MECHANISM
Alfredo Ferrari, Pritschenstrasse 278, and Adolf Gasser, Fallsgasse 246, both of Mauren, Liechtenstein
Filed Mar. 30, 1959, Ser. No. 802,796
Claims priority, application Austria Apr. 24, 1958
11 Claims. (Cl. 88—57)

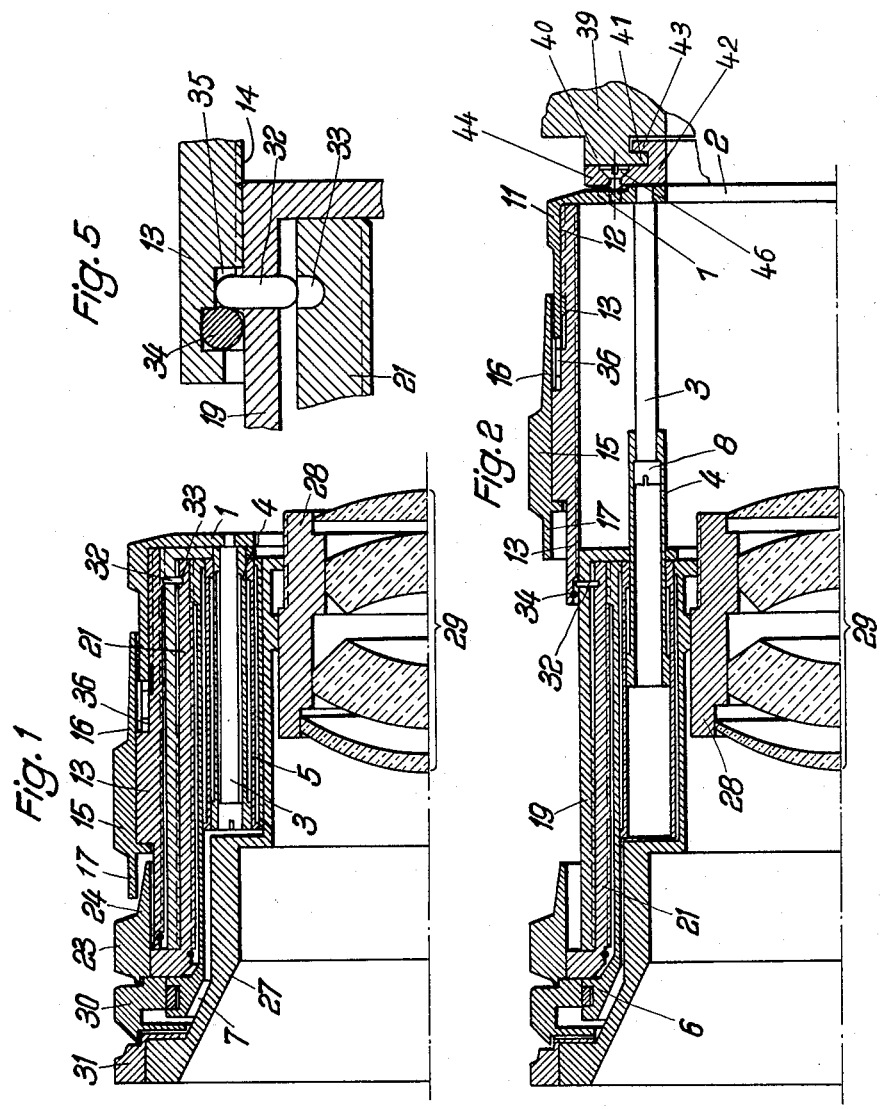

Photographic lenses, particularly replaceable lenses for reflex cameras, comprising mount parts which are interconnected by screw threads and one of which carries the optical system whereas another one overlaps the entire unit like a hollow drum in the infinity position of the optical system have already been disclosed and proposed in order to enable the use of the lens for long-range, short-range and very-short-range photographs without intermediate rings, intermediate bellows or other changes in the lens. Where several mount members interconnected by screw threads were used, it was left to the friction conditions occurring whether one or the other lens holder member was moved or rotated first during the focusing movements because it was only necessary to establish certain distances of the optical system from the object to be photographed.

As distinguished from what is known, the present invention is based on the new recognition that substantial advantages can be achieved if it is no longer left to chance which mount member is moved first and which mount member follows during the focusing movement of the lens and if the construction of the lens is such that a predetermined mount member is rotated first and only after a complete extension thereof does an adjacent mount member, which is connected by screw threads to the former, begin its extension movement, which must be completed until a further mount member is moved. If the screw threads have graded leads, i.e., if different screw threads are used, the steep screw thread can be used for a very quick coarse focusing of the optical system. The fine focusing is subsequently performed by moving a mount member having a smaller lead so that during focusing relatively large angles of rotation will result in minimum displacements of the optical system in the optical axis. This gives a very great increase in the precision of focusing. A third pair of screw threads can be used for a very fine focusing. This does not exhaust the possibilities for providing additional mount members.

Based on this recognition, photographic lenses, particularly replaceable lenses for reflex cameras, which lenses have mount members interconnected by screw threads, one of which members carries the optical system whereas another one overlies the whole like a hollow drum in the infinity position of the system, are characterized by an arrangement of means which release the mount members for extension only in succession in such a manner that only after the complete extension of one of the mount members can another mount member be moved to an extended position. In addition, means may be provided which lock completely extended mount members in the extended position against rearward movements as soon as other mount members are subjected to extension movements.

Both means may be provided in the form of common parts, which may be of extremely simple construction in that these means consist of a pin which is transversely movable in a mount member and the head portions of which are in registry with openings in the adjacent mount members so that a mount member which receives a pin head portion is locked against rotation.

It is not essential to provide screw threads having different leads. Screw threads having equal leads may be used too because in any case the advantage is afforded that the scales provided on the rotatable mount members or parts can be exactly calibrated in accordance with the distance between the object and the camera.

The complete extension of a mount member corresponds advantageously to a rotation of not more than 360° of the adjacent mount member in screwed mesh therewith in order to enable a marking of the scales in accordance with said distances.

Another new recognition leads to the construction of the bearings of the rotatable mount members as screw threads. If cylindrical bearings were used in the usual manner, exact fits would be required as well as annular stops for holding the parts carried in the bearings in position. Both requirements are eliminated if screw threads are used as bearings. In this case, however, screw threads having an extremely small lead, e.g., of 0.5 mm. for a rotation of 360°, are used. As a result, the position of the mount member which can be rotated by not more than 360° during the adjustment, at most, will vary only by 0.5 mm. and in proportion with the respective angle of rotation so that the focusing operation is not impaired. On the other hand, the advantage is afforded that the annular stops can be entirely omitted. It has been found suitable, however, to provide the mount member thus mounted with detent means which become effective when the adjacent mount member in mesh by means of the screw threads has been completely extended.

The drawing represents an embodiment of the invention in the example of a photographic lens provided with two pairs of screw threads.

Specifically,

FIG. 1 is a longitudinal sectional view showing the lens in infinity position.

FIG. 2 is again a longitudinal sectional view showing the same lens in a position in which the first mount member, which is rotatable alone first during extension movements, had served for completely extending the other mount members.

FIG. 3 is a longitudinal sectional view showing the lens in the position in which the mount member not yet extended in FIG. 2 has been extended so that the lens has been extended to its full length.

FIG. 4 is an enlarged radial sectional view, taken through the axis of the optical system, and showing the coarse focusing ring and the mount member largest in diameter, which is overlapped by said ring. The section is taken at the point where a detent means is provided between the mount member largest in diameter and a connecting member provided on the optical apparatus and serving for mounting and guiding said mount member.

FIG. 5 is an enlarged view of the locking pin arrangement of FIGS. 1 to 3.

FIG. 6 is a top plan view taken in the direction of the arrow VI on the detent means in FIG. 4 after removal of the scale and adjusting flange of the coarse focusing ring.

FIG. 7 is a top plan view showing the coarse focusing ring with the scale and adjusting flange.

FIG. 8 is a top plan view of the coarse focusing ring of the lens also with the scale and focusing flange attached thereto.

In all embodiments, 1 is the connecting ring for the lens, which ring receives in its opening 2 the connecting member, not shown, for the camera. This connecting member will vary in construction in dependence on the type of camera with which the lens is to be used. The connecting ring 1 carries also a telescopic straight guide, which ensures that the extended mount members cannot rotate relative to the connecting ring 1 and the camera.

In the present case these telescopic straight guides consist of the telescopic part 3 smallest in diameter, which is screwed into the connection ring 1. 4 is the adjoining telescopic tube. Another telescopic tube 5 is slidably connected to the nut member 6 having the screw thread smallest in diameter and is vented to the cavity 7 so that the movement will not be obstructed. As the cavity 7 is substantially closed toward the outside, this enables a more or less effective braking in the axial position in order to avoid unnecessary stresses being set up by playing with the lens. The telescopic parts 3, 4 and 5 form stops at 8, 9 and 10, which in addition to the subsequently mentioned limiting stops for the mount members also limit the movement of the latter.

Additional measures for the actuation of spring-type diaphragms provided in the lens have not been shown in the drawings in order to maintain the clearness thereof.

It is within the scope of the present invention to provide the lens with a spring-type diaphragm and with the means for actuating the same.

The following additional measures are provided according to the invention.

The connecting ring 1 forms at 11 the outer tubular part of a screw thread; the mating thread 12 is formed by the nut member 13. For the nut member 13 and with it the mount member having the screw thread largest in diameter, these screw threads 11, 12 provide a bearing in the connecting ring 1 and in the connecting member, not shown, of the camera. This screw thread largest in diameter 14 has also the greatest lead so that the mount member 13 will be constructed so that its rotation causes the extension of all other mount members. To this end the mount member 13 has non-rotatably connected thereto the coarse focusing ring 15, the flange 16 of which overlaps that flange of the ring 1 which forms the screw thread 11. On the opposite side, the coarse focusing ring has a second flange 17 for overlapping the fine focusing ring, which will be referred to hereinafter. The flange ring 16 carries suitably also the distance scale, which corresponds to the rotations of parts 15, 16, 17, 13, 14. The coarse focusing ring 15 is knurled or milled to facilitate the adjustment of said rotatable parts. The screw thread 14 meshes with the screw thread 18 on the adapter ring 19, the inner boundary surface of which forms another screw thread 20, which is the bearing for the mount member 21 having a screw thread 22 meshing with the screw thread 20. The screw threads 20, 22 are much longer than the screw threads 11, 12 to provide a particularly good guidance for the mount member 21, which protrudes considerably from the connection ring 1. The mount member 21 carries at 23 a fine focusing ring having the conical flange 24, on which the distance scale can be accommodated which corresponds to the respective rotation angle and with it the length of extension of the mount member 21. For this reason the ring member 23 can be considered a fine focusing ring because the mount member 21 forms at its inner boundary surface a screw thread 25 having a very small lead. The nut member 6 carrying the screw thread 26 mating with the screw thread 25 receives the inner ring member 27, which provides a bearing 28 for the optical system 29. Additional ring members mounted at 30 and 31 form parts of the spring-type diaphragm arrangement and the setting and, if desired, release means therefor unless the setting and release are not effected from the camera side.

In order to prevent a relative axial displacement of parts 21, 6 during a rotation of the coarse focusing ring 15 and to ensure that these mount members are extended as a whole out of member 13, the following measures are adopted.

As is illustrated in FIG. 2, the cross pin 32 is longitudinally displaceably arranged in the adapter ring 19. In the infinity position of the lens, shown in FIG. 1, the pin registers with the opening 33 in the mount member 21 whereas a displacement of the cross pin 32 from the opening 33 is prevented by the material which receives the mating screw thread 14 of the mount member 13. This means that the parts 19, 21 and with them the parts 19, 6 are relatively locked. For this reason a rotation of the coarse focusing ring 15 results only in a joint extension of parts 19, 21, as is shown in FIG. 2. Only when the cross pin 32 has been moved into engagement with the expanding ring 34, as is illustrated in FIG. 5, and the stop 8 of the telescopic rod 3 has been moved into engagement with the tapered end of the telescopic tube 4, can a rotation of the fine focusing ring 23 cause the cross pin 32 to be driven out because only in this position does an opening 35 in the mount member 13 register with the other head portion of the cross pin 32. This means that from this time on the fine focusing ring 23 become rotatable together with the mount member 21 so that the nut member 6 having the screw thread smallest in diameter of the screw threads 25, 26 is extended and that the parts 13, 19 are now also relatively locked and rotations of the fine focusing ring 23 in the opposite direction can only cause a retraction of part 6 into the mount member 21 rather than a retraction of the adapter ring 19 into the mount member 13. The relations are so selected that the position of FIG. 2 is obtained after a rotation of the coarse focusing ring 15 through 360° and that the position of FIG. 3 is not obtained until the fine focusing ring 23 has also been rotated by 360°.

Because a rotation of the mount member 13 by 360° results also in a rotation in the screw threads 11, 12 by the amount of the lead and the selection of a small lead, e.g., of 0.5 mm. for a rotation of 360° enables the axial displacement of the mount member 13 relative to the connecting ring 1 to be minimized, it is suitable to locate parts 1, 13 in this position by detent means. The construction thereof is shown in FIG. 4. The spring 36 is affixed to the mount member 13 and has a projection 37 in the form of a rounded nose. In said end position of parts 1 and 13 relative to each other the nose 37 registers with an opening 38 in the connecting ring 1 so that the nose 37 falls automatically into the opening 38 under the action of the spring forces produced as soon as said end position has been reached.

The lens constructed according to the invention can be used to special advantage in reflex cameras and in motion picture cameras provided with a reflex device. Such a camera is indicated fragmentarily in FIG. 2, which shows the connection between the connecting part 1 of the lens and this camera.

From what has been said hereinbefore it is apparent that the nut member 13 with the screw thread 14 forms in the sense of the present invention a first mount part largest in diameter, which receives and engages a second mount part 19 by means of the screw threads 14, 18. This second mount part 19 has previously been identified as an adapter ring. This second mount part 19 has an internal screw thread 20 in mesh with a corresponding screw thread 22 of a third mount part 21, which has previously been referred to as a mount member. This third mount part 21 has an internal screw thread at 25 in mesh with the mating screw thread 26 formed on the fourth mount part 6 smallest in diameter. It is within the nature of the invention that this does in no way exhaust the possibilities which are conceivable. Thus, the fourth mount part smallest in diameter, the so-called nut member 6, could have an internal screw thread in mesh with a mount part having basically the same construction as this mount part 19. This would require a sixth mount part 21 similar to the mount part 21 to be guided in this fifth mount part; these last-mentioned mount parts would again be connected by screw threads. This sixth mount part could then carry the one optical system 29 as is shown on the accompanying drawing for the fourth mount part or nut member 6. In another embodiment this mount part 6 could contain instead of the optical system two additional mount members similar to parts 19, 21 as the seventh and eighth mount parts and the optical system would be carried in the eighth mount part, which is smallest in diameter. Such arrangements are suitable to enable welldefined photographs of smallest objects in full size or even enlarged size while the lens can be moved to infinity position so that the entire environment of the small part to be photographed can be shown.

As an optical apparatus which is to be provided with a lens constructed according to the invention, a camera has been chosen the carrying wall of which facing the lens is indicated at 39 in FIG. 2. This carrying wall carries a ring member 40, which has internally protruding bayonet joint claws 41. These claws 41 serve for holding the adapter 42, which is also provided for this purpose with bayonet joint claws 43. The adapter 42 forms a flange 44, which is screwed by means of screws 46 to the connecting member 11 of the lens constructed according to the invention. Thus, the connecting member 11 and the adapter 42 form a joint element of construction, which can be connected to the camera 39 by means of the bayonet joint 41, 43 when the lens is to be moved into position whereas the same bayonet joint 41, 43 can be used to separate the lens from the camera 39.

We claim:

1. A camera focusing mechanism comprising, in combination, outer tubular means having inner threads; inner tubular means coaxial with and spaced from said outer tubular means and having outer threads; lens means carried by said inner tubular means in the interior thereof coaxially with said inner and outer tubular means; intermediate annular means surrounding said inner tubular means and surrounded by said outer tubular means, said intermediate annular means having outer threads threaded into said inner threads of said outer tubular means and inner threads threaded into said outer threads of said inner tubular means; and double blocking means cooperating with said intermediate annular means and both said tubular means and blocking, on the one hand, turning of one of said tubular means relative to said intermediate annular means unless said intermediate annular means and the other of said tubular means are in their fully extended position with respect to each other and blocking, on the other hand, turning of said other tubular means relative to said intermediate annular means unless said intermediate annular means and said one of said tubular means are in their fully contracted position relative to each other.

2. In a camera focusing mechanism, in combination, outer tubular means having inner threads; intermediate tubular means having outer threads threaded into said inner threads of said outer tubular means; inner tubular means having outer threads, said intermediate tubular means having inner threads into which said outer threads of said inner tubular means are threaded; photographic lens means carried by said inner tubular means in the interior thereof; and means cooperating with all of said tubular means for preventing said inner tubular means from moving outwardly of said intermediate tubular means until the latter has moved outwardly to a fully extended position with respect to said outer tubular means.

3. A camera focusing mechanism comprising, in combination, outer tubular means having inner threads; inner tubular means coaxial with and spaced from said outer tubular means and having outer threads; lens means carried by said inner tubular means in the interior thereof coaxially with said inner and outer tubular means; intermediate annular means surrounding said inner tubular means and surrounded by said outer tubular means, said intermediate annular means having outer threads threaded into said inner threads of said outer tubular means and inner threads threaded into said outer threads of said inner tubular means; means cooperating with said intermediate annular means and one of said tubular means for preventing relative turning between said intermediate annular means and said one tubular means until said intermediate annular means and the other of said tubular means have turned with respect to each other to their fully extended positions with respect to each other; and means adapted to be connected to a camera and supporting said outer tubular means for rotary movement.

4. In a camera focusing mechanism, in combination, inner and outer coaxial tubular means spaced from each other, said inner tubular means having outer threads and said outer tubular means having inner threads; photographic lens means carried by said inner tubular means in the interior thereof; and intermediate tube means located between and threadedly cooperating with said inner and outer tubular means, said intermediate tube means including an outer tubular member threadedly connected with said outer tubular means and an inner tubular member threadedly connected with said inner tubular means and means interconnecting said inner and outer tubular members of said intermediate means to prevent relative turning therebetween until said intermediate means is threaded outwardly from said outer tubular means to a final extended position.

5. In a camera focusing mechanism, in combination, first, second, third, fourth, and fifth coaxial tubular elements telescopically threaded one within the other with said first tubular element adapted to remain stationary and having the largest diameter and said fifth tubular element having the smallest diameter; means cooperating with said first, third, and fifth tubular elements for constraining said first, third and fifth tubular elements against rotation with respect to each other so that the said third and fifth tubular elements are constrained to move only axially, said second tubular element being turnable with respect to and threadedly connected with said first and third tubular elements while said fourth tubular element is turnable with respect to and threadedly connected with said third and fifth tubular elements; and means cooperating with said second, third and fourth tubular elements to prevent rotation of said fourth element with respect to said third and fifth elements until after said third element has been moved outwardly from said second element to a final extended position.

6. In a camera focusing mechanism, in combination, first, second third, fourth, and fifth coaxial tubular elements telescopically threaded one within the other with said first tubular element adapted to remain stationary and having the largest diameter and said fifth tubular element having the smallest diameter; means cooperating with said first, third, and fifth tubular elements for constraining said first, third and fifth tubular elements against rotation with respect to each other so that the said third and fifth tubular elements are constrained to move only axially, said second tubular element being turnable with respect to and threadedly connected with said first and third tubular elements while said fourth tubular element is turnable with respect to and threadedly connected with said third and fifth tubular elements; and means cooperating with said second, third and fourth tubular elements to prevent rotation of said fourth element with respect to said third and fifth elements until after said third element has been moved outwardly from said second element to a final extended position, said means comprising a pin extending through a bore of said third element radially with respect to the common axis of all of said elements and into a recess of said fourth element to prevent the latter from rotating with respect to said third element, said second element having when said third element is in its end extended position with respect to said second element a recess receiving said pin when the latter moves outwardly away from the common axis of said tubular elements so that when said pin is in said recess of said second element said fourth element is released for turning movement with respect to said third and fifth elements so that the fifth element may be turned outwardly away from said fourth element.

7. In a camera focusing mechanism, in combination, first, second, third, fourth, and fifth coaxial tubular elements telescopically threaded one within the other with said first tubular element adapted to remain stationary and having the largest diameter and said fifth tubular element having the smallest diameter; means cooperating with said first, third, and fifth tubular elements for constraining said first, third and fifth tubular elements against rotation with respect to each other so that the said third and fifth tubular elements are constrained to move only axially, said second tubular element being turnable with respect to and threadedly connected with said first and third tubular elements while said fourth tubular element is turnable with respect to and threadedly connected with said third and fifth tubular elements; and means cooperating with said second, third and fourth tubular elements to prevent rotation of said fourth element with respect to said third and fifth elements until after said third element has been moved outwardly from said second element to a final extended position, said second element having with respect to said first element an extremely small lead on the order of 0.5 mm.

8. In a camera focusing mechanism, in combination, first, second, third, fourth, and fifth coaxial tubular elements telescopically threaded one within the other with said first tubular element adapted to remain stationary and having the largest diameter and said fifth tubular element having the smallest diameter; means cooperating with said first, third, and fifth tubular elements for constraining said first, third and fifth tubular elements against rotation with respect to each other so that the said third and fifth tubular elements are constrained to move only axially, said second tubular element being turnable with respect to and threadedly connected with said first and third tubular elements while said fourth tubular element is turnable with respect to and threadedly connected with said third and fifth tubular elements; and means cooperating with said second, third and fourth tubular elements to prevent rotation of said fourth element with respect to said third and fifth elements until after said third element has been moved outwardly from said second element to a final extended position, said second element having with respect to said first element an extremely small lead on order of 0.5 mm., all of said elements being limited to an angle of turning with respect to the other elements which is no greater than 360°.

9. A camera focusing mechanism as recited in claim 1 and wherein said outer threads of said intermediate annular means are surrounded at all times by said outer tubular means and said outer threads of said inner tubular means are surrounded at all times by said intermediate annular means so that said outer threads are never exposed to the exterior, cannot be engaged by the operator, and are protected from dust and other deposits.

10. In a camera focusing mechanism, in combination, outer tubular lens barrel means; inner tubular lens barrel means arranged coaxially with and inside of said outer tubular lens barrel means movably in axial direction relative to said outer tubular lens barrel means; lens means carried by one of said tubular lens barrel means; intermediate annular means arranged between said outer and inner tubular lens barrel means, said intermediate annular means movable in axial direction relative to said outer tubular lens barrel means from a first predetermined relative position in relation to said outer tubular lens barrel means into a plurality of other positions relative to said outer tubular lens barrel means and movable in axial direction relative to said inner tubular lens barrel means from a second predetermined relative position in relation to said inner tubular lens barrel means into a plurality of other positions relative to said inner tubular lens barrel means; and blocking means cooperating with said intermediate annular means and both said tubular lens barrel means, blocking relative movement between said intermediate annular means and said inner tubular lens barrel means unless said intermediate annular means and said outer tubular lens barrel means are in said predetermined relative position and blocking relative movement between said intermediate annular means and said outer tubular lens barrel means unless said intermediate annular means and said inner tubular lens barrel means are in said second predetermined relative position.

11. In a camera focusing mechanism, in combination, outer tubular lens barrel means; inner tubular lens barrel means arranged coaxially with and inside of said outer tubular lens barrel means movably in axial direction relative to said outer tubular lens barrel means; lens means carried by one of said tubular lens barrel means; intermediate annular means arranged between said outer and inner tubular lens barrel means, said intermediate annular means movable in axial direction relative to said outer tubular lens barrel means from a first predetermined relative position in relation to said outer tubular lens barrel means into a plurality of other positions relative to said outer tubular lens barrel means and movable in axial direction relative to said inner tubular lens barrel means from a second predetermined relative position in relation to said inner tubular lens barrel means into a plurality of other positions relative to said inner tubular lens barrel means; and blocking means cooperating with said intermediate annular means and both said tubular lens barrel means, blocking relative movement between said intermediate annular means and said inner tubular lens barrel means unless said intermediate annular means and said outer tubular lens barrel means are in said predetermined relative position and blocking relative movement between said intermediate annular means and said outer tubular lens barrel means unless said intermediate annular means and said inner tubular lens barrel means are in said second predetermined relative position, one of said predetermined adjusted positions being a fully extended position while the other of said predetermined adjusted positions is a predetermined contracted position.

References Cited in the file of this patent

UNITED STATES PATENTS

| | | |
|---|---|---|
| 1,950,166 | Durholz | Mar. 6, 1934 |
| 2,019,735 | Scott | Nov. 5, 1935 |
| 2,124,161 | Cook et al. | July 19, 1938 |
| 2,128,365 | Killman et al. | Aug. 30, 1938 |
| 2,245,212 | Mihalyi et al. | June 10, 1941 |
| 2,180,027 | Wittel | Nov. 14, 1939 |
| 2,245,212 | Mihalyi et al. | June 10, 1941 |
| 2,263,024 | Wood | Nov. 18, 1941 |
| 2,380,829 | Eddy | July 31, 1945 |
| 2,526,433 | Svensson | Oct. 17, 1950 |